US012760188B2

(12) United States Patent
Park et al.

(10) Patent No.: US 12,760,188 B2
(45) Date of Patent: Oct. 13, 2026

(54) COMPOSITION FOR BLOCKING RADON AND METHOD FOR PREPARING THE SAME

(71) Applicant: KOREA ATOMIC ENERGY RESEARCH INSTITUTE, Daejeon (KR)

(72) Inventors: Jong Seok Park, Iksan-si (KR); Sung In Jeong, Jeongeup-si (KR); Joon Pyo Jeun, Jeonju-si (KR); Jang Geon Lee, Daejeon (KR); Kab Soo Kim, Jeongeup-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 1080 days.

(21) Appl. No.: 17/732,216

(22) Filed: Apr. 28, 2022

(65) Prior Publication Data

US 2023/0058648 A1 Feb. 23, 2023

(30) Foreign Application Priority Data

Aug. 13, 2021 (KR) ........................ 10-2021-0107330
Sep. 23, 2021 (KR) ........................ 10-2021-0125441

(51) Int. Cl.

| | |
|---|---|
| ***C09D 5/32*** | (2006.01) |
| ***C09D 7/61*** | (2018.01) |
| ***C09D 123/08*** | (2006.01) |
| ***C09D 175/04*** | (2006.01) |
| ***C09D 183/04*** | (2006.01) |

(52) U.S. Cl.

CPC ................ *C09D 5/32* (2013.01); *C09D 7/61* (2018.01); *C09D 123/0853* (2013.01); *C09D 175/04* (2013.01); *C09D 183/04* (2013.01)

(58) Field of Classification Search

None

See application file for complete search history.

(56) References Cited

U.S. PATENT DOCUMENTS

| | | | | |
|---|---|---|---|---|
| 2006/0074141 A1* | 4/2006 | Hayner | ..................... | G21F 1/10 523/136 |
| 2018/0362722 A1 | 12/2018 | Ahn et al. | | |

FOREIGN PATENT DOCUMENTS

| | | | | | |
|---|---|---|---|---|---|
| CN | 101001931 A | | 7/2007 | | |
| CN | 104449191 A | * | 3/2015 | | |
| CN | 106318061 A | | 1/2017 | | |
| CN | 109504262 A | * | 3/2019 | ........... | C09D 175/04 |
| HU | 210483 B | * | 7/1995 | | |
| JP | 2002-322367 A | | 11/2002 | | |
| KR | 10-2006-0039692 A | | 5/2006 | | |
| KR | 10-2006-0102384 A | | 9/2006 | | |
| KR | 10-2009-0047983 A | | 5/2009 | | |
| KR | 10-2010-0005586 A | | 1/2010 | | |
| KR | 101303136 B1 | | 9/2013 | | |
| KR | 101596470 B1 | * | 2/2016 | ............. | C09J 11/04 |
| KR | 101598191 B1 | | 2/2016 | | |
| KR | 10-2017-0064493 A | | 6/2017 | | |
| KR | 10-2017-0085700 A | | 7/2017 | | |
| KR | 10-2018-0031544 A | | 3/2018 | | |
| KR | 10-2019-0093317 A | | 8/2019 | | |
| KR | 102119857 B1 | * | 6/2020 | | |
| KR | 102159754 B1 | | 9/2020 | | |
| KR | 102212396 B1 | | 2/2021 | | |
| KR | 102241430 B1 | * | 4/2021 | ............... | B05D 7/04 |
| WO | WO-2006/011697 A1 | | 2/2006 | | |

OTHER PUBLICATIONS

Extended European Search Report dated Nov. 2, 2022 issued in corresponding European Appln. No. 22170429.9.
Korean Office Action dated Apr. 13, 2023 issued in corresponding Korean Appln. No. 10-2021-0107330.
Korean Notice of Allowance dated Jul. 16, 2024 issued in corresponding Korean Appln. No. 10-2024-0086882.
Oh-Han, Gwon et al., "Properties of Radon Gas Absorption of Matrix According to Types of Absorbent", Korea Inst. Build. Constr, vol. 17, No. 1, Feb. 2017, pp. 15-21.
Chinese Office Action dated May 9, 2023 issued in corresponding Chinese Patent Application No. 202210457186.8.
Korean Office Action dated Jul. 20, 2023 issued in corresponding Korean Patent Application No. 10-2021-0125441.

* cited by examiner

*Primary Examiner* — Tanisha Diggs
(74) *Attorney, Agent, or Firm* — Harness, Dickey & Pierce, P.L.C.

(57) ABSTRACT

Provided are a composition for blocking radon and a method for preparing the same, and more particularly, to a composition for blocking radon including ethylene vinyl acetate (EVA); one or more polymer resins selected from the group consisting of polyurethane (PU) and silicone resin; and anionic surfactants, and a method for preparing a composition for blocking radon including irradiating radiation to the composition for blocking radon.

6 Claims, 12 Drawing Sheets
(1 of 12 Drawing Sheet(s) Filed in Color)

INVENTIVE EXAMPLE 1
(EPS)

INVENTIVE EXAMPLE 2
(EPSZe)

INVENTIVE EXAMPLE 1
(EPS)

INVENTIVE EXAMPLE 2
(EPSZe)

INVENTIVE EXAMPLE 5 (ESi20S2) | INVENTIVE EXAMPLE 6 (T0.5) | INVENTIVE EXAMPLE 7 (W0.5)

ANTIBACTERIAL TEST AGAINST STAPHYLOCOCCUS AUREUS

INVENTIVE EXAMPLE 5 (ESi20S2) | INVENTIVE EXAMPLE 6 (T0.5) | INVENTIVE EXAMPLE 7 (W0.5)

ANTIBACTERIAL TEST AGAINST E. COLI

CONTROL GROUP | INVENTIVE EXAMPLE 5 (ESi20S2) | INVENTIVE EXAMPLE 7 (W0.5)

ANTIFUNGAL TEST AGAINST BLACK MOLD

COMPOSITION FOR BLOCKING RADON AND METHOD FOR PREPARING THE SAME

CROSS-REFERENCE TO RELATED APPLICATION(S)

This application claims benefit of priority to Korean Patent Application Nos. 10-2021-0107330 filed on Aug. 13, 2021 and 10-2021-0125441 filed on Sep. 23, 2021, in the Korean Intellectual Property Office, the disclosures of which are incorporated herein by reference in their entirety.

BACKGROUND

1. Field

The present disclosure relates to a composition for blocking radon and a method for preparing the same, and more particularly, to a composition exhibiting an excellent radon blocking effect and exhibiting antibacterial properties, and a method for preparing the same.

2. Description of Related Art

Recently, substances generated from various building materials may be very harmful to the human body, and in particular, the risk of radon, a management item for indoor air quality, is increasing among modern people who are mainly active indoors, so proper management of radon is required. Such radon has an element symbol of $^{222}Rn$, and is a naturally radioactive material that is a colorless, odorless, tasteless gas generated during decay of uranium present in rocks, soil, building materials, or the like.

It has been known that radon and radon progeny inhaled into the human body through respiration are decayed to release alpha rays, thereby destroying lung tissue. Accordingly, the World Health Organization (WHO) has defined that radon accounts for 3 to 14% of lung cancer cases worldwide, and radon is the main cause of lung cancer following smoking. Because of these risks of radon, the WHO has established and promoted the "International Radon Prevention Plan" and recommends managing concentrations of radon in indoor air.

Therefore, a radon shielding construction for painting a wall of a building with a material capable of shielding radon has been proposed. For example, Korean Patent Laid-Open Publication No. 10-2017-0085700 discloses an aqueous coating composition for reducing radon including (a) 1 to 30 wt % of adsorption functional oligomer containing cyclodextrin as a main component; (b) 1 to 10 wt % of propylene glycol; (c) 1 to 10 wt % of ethanol; (d) 1 to 3 wt % of additives including a thickener, a defoamer, and a dispersant; and (e) a balance of water.

Since damage to the coating film is easy to occur with the method for forming a coating film on a surface of concrete or the coating film, there may be a problem in that the above-described composition may not maintain the radon blocking effect for a long time, and it is difficult to apply to parts such as gaps in buildings, construction materials, and the like. In addition, some of the conventionally used paints use chemical products with excellent adhesion, such as chloroprene, polyvinyl acetate, and polyacrylic acid ester. Since these synthetic resin adhesives may retain volatile monomers after painting and may also generate toxic gases in the event of a fire, there is a problem that it may not be concluded that these synthetic resin adhesives are completely harmless to the environment.

Therefore, radon blocking paste-related technologies, which have a wide range of applications, such as applying to reduce radon entering through cracks or crevices in buildings, building materials, etc., is eco-friendly and harmless to the human body, and has antibacterial activity, are expected to be widely applied in related fields.

SUMMARY

An aspect of the present disclosure may provide a composition for blocking radon having excellent radon blocking performance and antibacterial activity.

Another aspect of the present disclosure is to provide a method for preparing a composition for blocking radon as described above.

According to an aspect of the present disclosure, there is provided a composition for blocking radon including: ethylene vinyl acetate (EVA); one or more polymer resins selected from the group consisting of polyurethane (PU) and silicone resin; and anionic surfactants.

According to another aspect of the present disclosure, there is provided a method for preparing composition for blocking radon including: preparing the composition for blocking radon of the present disclosure; and irradiating radiation to the composition for blocking radon.

BRIEF DESCRIPTION OF DRAWINGS

The patent or application file contains at least one drawing executed in color. Copies of this patent or patent application publication with color drawing(s) will be provided by the Office upon request and payment of the necessary fee.

The above and other aspects, features, and advantages of the present disclosure will be more clearly understood from the following detailed description taken in conjunction with the accompanying drawings, in which:

FIG. 9A is a diagram illustrating an upper surface of the lid coating the hole in the lid of the bottle containing the radon generation source, FIG. 9B is a diagram illustrating a side photograph of a median bottle containing a radon generation source, and FIG. 9C is a photograph showing a radon blocking measurement chamber;

DETAILED DESCRIPTION

Figure 1A:
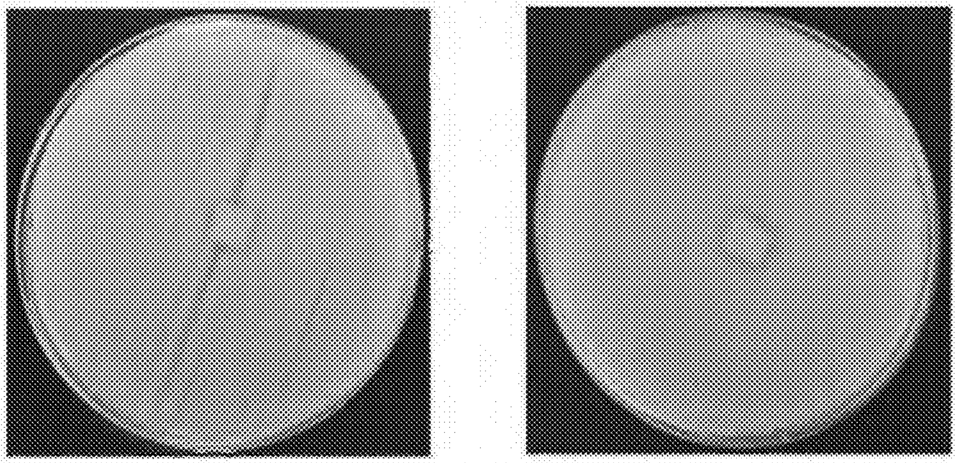
FIG. 1A is a photograph of the result of confirming antimicrobial activity of compositions of Inventive Example 1 (left) and Inventive Example 2 (right) against *Staphylococcus aureus*.

Hereinafter, exemplary embodiments in the present disclosure will be described with reference to the accompanying drawings. However, exemplary embodiments in the present disclosure may be modified in several other forms, and the scope of the present disclosure is not limited to exemplary embodiments to be described below.

According to the present disclosure, there is provided a composition for blocking radon that is eco-friendly, harmless to the human body, and has antibacterial properties.

The composition for blocking radon of the present disclosure includes ethylene vinyl acetate (EVA); one or more polymer resins selected from the group consisting of polyurethane (PU) and a silicone resin; and an anionic surfactant, and more specifically, the composition for blocking radon includes 40 to 90 wt % of polymer resin, 10 to 50 wt % of polyurethane (PU), and 1 to 10 wt % of anionic surfactant based on the total weight of the composition for blocking radon. For example, the composition for blocking radon includes 60 to 80 wt % of ethylene vinyl acetate (EVA), 10 to 35 wt % of polymer resin, and 1 to 10 wt % of anionic surfactants based on the total weight of the composition for blocking radon.

When the content of ethylene vinyl acetate (EVA) is less than 40 wt % based on the total weight of the composition for blocking radon, there may be a problem in impact resistance performance, and when the content of ethylene vinyl acetate (EVA) exceeds 90 wt %, there may be a problem in workability due to increased viscosity. For example, the composition for blocking radon of the present disclosure may include 60 to 85 wt % of ethylene vinyl acetate (EVA) based on the total weight of the composition for blocking radon, preferably 65 to 80 wt % of ethylene vinyl acetate (EVA).

When the content of the polymer resin is less than 10 wt % based on the total weight of the composition for blocking radon, the improvement in weather resistance and heat resistance of the coating film may not be expected, and when the content of the polymer exceeds 50 wt %, there is a problem in that workability is reduced. For example, the composition for blocking radon of the present disclosure may include 15 to 40 wt % of the polymer resin based on the total weight of the composition for blocking radon, preferably 20 to 35 wt %, for example, 25 to 30 wt %.

When the content of the anionic surfactant is less than 1 wt % based on the total weight of the composition for blocking radon, there is a problem of lowering thermal stability, and when the content of the anionic surfactant exceeds 10 wt %, there is a problem of weakening the durability of the coating film. For example, the composition for blocking radon of the present disclosure may include 1 to 5 wt % of anionic surfactant based on the total weight of the composition for blocking radon, preferably 1 to 3 wt % of anionic surfactant.

The anionic surfactant that may be used in the present disclosure may be one or more anionic surfactants selected from the group consisting of sodium dodecyl sulfate (SDS), sodium bis(2-ethylhexyl)sulfosuccinate (AOT), dodecylbenzenesulfonic acid, sodium dioctylsulfosuccinate, sodium alkylphenol ether sulfonate, and sodium alkyl sulfonate, and for example, sodium dodecyl sulfate (SDS) may be used.

Furthermore, the composition for blocking radon of the present disclosure may further include one or more inorganic fillers selected from the group consisting of titanium dioxide, illite, zeolite, activated carbon, and nanoclay, and may include, preferably illite or zeolite. When such an inorganic filler is additionally included, the radon blocking rate may be further improved.

The inorganic filler that may be used in the present disclosure is, for example, preferably in the form of nanopowder having an average particle diameter of 200 to 3,000 nm.

Meanwhile, the inorganic filler is preferably included in an amount of 0.1 to 20 parts by weight per 100 parts by weight of a mixture including ethylene vinyl acetate (EVA), a polymer resin, and an anionic surfactant, and may be included in an amount of, for example, 0.1 to 1 wt %. Meanwhile, the inorganic filler is preferably included in an amount of 0.1 to 1 wt % based on the total weight of the antibacterial composition for blocking radon. When the inorganic filler is included in less than 0.1 parts by weight per 100 parts by weight of the mixture, the additional effect of the inorganic filler may be insufficient, and when the inorganic filler exceeds 20 parts by weight per 100 parts by weight of the mixture, workability and physical properties of the coating film may deteriorate.

The formulation of the composition for blocking radon of the present disclosure is not particularly limited, but may be a paste formulation, and in the case of such a paste formulation, it may be used in various applications including narrow gaps, so there is no limitation on the subject of application. For example, the composition for blocking radon of the present disclosure may be a coating composition.

Furthermore, according to the present disclosure, there is provided a method for preparing the composition for blocking radon of the present disclosure.

The method for preparing the composition for blocking radon of the present disclosure includes preparing the composition for blocking radon of the present disclosure as described above; and irradiating radiation to the composition for blocking radon.

In the method for preparing the composition for blocking radon, the above-described matters related to the composition for blocking radon are equally applied.

The radiation that may be applied in the irradiating of the radiation may be one selected from the group consisting of gamma rays, electron beams, ultraviolet rays, and X-rays, preferably electron beams.

In this case, the radiation may be irradiated with a dose of 1 to 50 kGy, for example, 1 to 20 kGy, preferably a dose of 2 to 5 kGy. When the dose of the radiation is less than 1 kGy, crosslinking of the composition for blocking radon tends to be insufficient, and when the dose of the radiation exceeds 50 kGy, the viscosity is rapidly increased due to the increase in the crosslinking density, and there is a problem in that the workability deteriorates.

As such, the composition for blocking radon of the present disclosure irradiated with radiation has a simple construction method, and may be applied even between cracks and crevices of buildings, construction materials, etc., thereby effectively shielding the radon generated thereby.

More specifically, the construction method of the composition for blocking radon of the present disclosure includes applying the composition for blocking radon of the present disclosure to a base material or filling in gaps; and drying the composition.

In this case, the base material to which the radon blocking composition of the present disclosure may be applied may be one selected from the group consisting of cement, concrete, plastic, wood paneling, sand, and gravel, but is not limited thereto. For example, the substrate may include a case with cracks or gaps. That is, the applying may include a process of filling a gap existing in the base material.

Meanwhile, the drying may be performed by natural drying at room temperature for 6 to 24 hours, but is not limited thereto.

As such, the composition for blocking radon of the present disclosure may be simple to construct, implement a safe indoor environment by an easy process, and exhibit antibacterial properties, thereby minimizing damage to the human body, increasing the lifespan of buildings and construction materials, and furthermore, expressing antibacterial and antifungal properties.

Hereinafter, the present disclosure will be described in more detail through Inventive Example. The following Inventive Examples are merely illustrative to help the understanding of the present disclosure, and the scope of the present disclosure is not limited thereto.

Examples

1. Method for Preparing Composition for Blocking Radon

An ethylene vinyl acetate (EVA) solution, polyurethane (PU) or silicone resin, and sodium dodecyl sulfate (SDS) to improve compatibility and flexibility of the prepared film-type coating layer were mixed according to the composition of Table 1 below. In the case of Inventive Examples, zeolite, activated carbon, nanoclay, titanium dioxide (anatase), and illite as inorganic fillers were added according to the contents of Table 1 below, respectively, and then mixed at 1500 to 1700 rpm for 3 to 5 minutes using a centrifugal mixer. Furthermore, electron beams of 0 to 10 kGy were irradiated using an electron beam accelerator.

TABLE 1

| Sample | | EVA | PU | Silicone resin | SDS | Inorganic filler (Per EVA + PU + SDS 100 parts by weight) |
|---|---|---|---|---|---|---|
| Comparative Inventive Example 1 | EP | 70 wt % | 30 wt % | | | |
| Inventive Example 1 | EPS | 68 wt % | 30 wt % | | 2 wt % | — |
| Inventive Example 2 | EPSZe | 63 wt % | 30 wt % | | 2 wt % | 5 parts by weight of zeolite |
| Inventive Example 3 | EPSAc | 63 wt % | 30 wt % | | 2 wt % | 5 parts by weight ofactivated carbon |
| Inventive Example 4 | EPSNc | 63 wt % | 30 wt % | | 2 wt % | 5 parts by weight of nanoclay |
| Comparative Example 2 | ESi30 | 70 wt % | | 30 wt % | — | — |
| Comparative Example 3 | ESi20 | 80 wt % | | 20 wt % | — | — |
| Inventive Example 5 | ESi20S2 | 78 wt % | | 20 wt % | 2 wt % | — |
| Inventive Example 6 | T0.5 | 77.5 wt % | | 20 wt % | 2 wt % | 0.5 wt % of titanium dioxide (anatase) |
| Inventive Example 7 | W0.5 | 77.5 wt % | | 20 wt % | 2 wt % | 0.5 wt % of illite |

2. Antibacterial and Antifungal Test of Composition for Blocking Radon (1) Antibacterial Test

*Staphylococcus aureus* (ATCC 6538) and *E. coli* (ATCC 8739) were cultured 16 hours before being diluted so that the turbidity became Mcfarland standard 0.5, and then were smeared with a cotton swab on Mueller Hinton agar.

After the cotton swab smear, a film sample of 8 mm×8 mm size was placed in a center of a medium and incubated at 37° C. for 24 hours, and a size of a clear zone around a paper disk was determined.

In this case, the criteria for determining the clear zone were as follows:

When the medium was visually checked from a distance of about 30 cm, a range in which bacteria were not grown at all was recognized as a clear area, and when the clear area is oval, the smaller diameter was recognized as the clear area. A portion where bacteria were thinly grown or a single colony is present was excluded from the clear area.

Figure 1B:
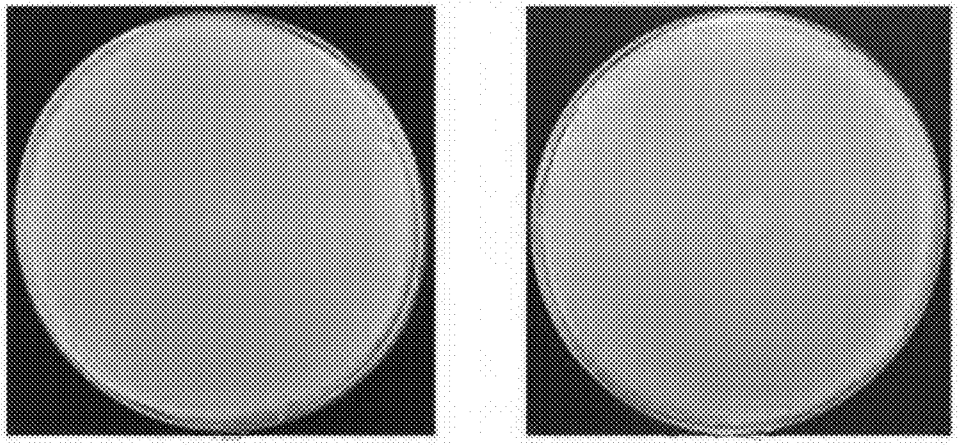
FIG. 1B is a photograph of the result of confirming the antibacterial activity of the composition of Inventive Example 1 (left) and Inventive Example 2 (right) against *E. coli;*

As a result, as can be seen in FIG. 1A, in *Staphylococcus aureus*, both the compositions of Inventive Example 1 (EPS) and Inventive Example 2 (EPSZe) exhibited antibacterial activity in a clear area of 11 mm, and as can be seen in FIG. 1B, in *E. coli*, antibacterial activity of 9 mm was exhibited in Inventive Example 1 (EPS) and antibacterial activity of 10 mm was exhibited in Inventive Example 2 (EPSZe).

Figure 12A:
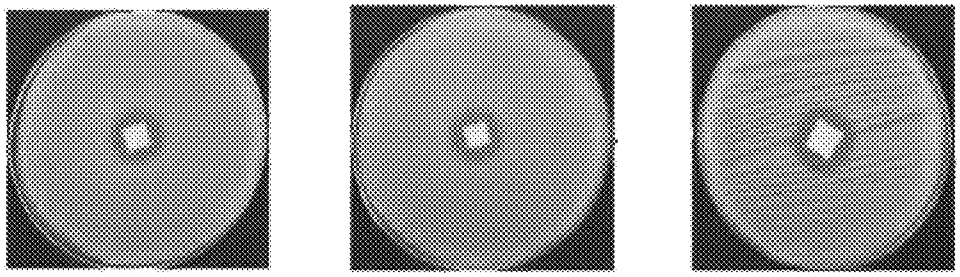
FIG. 12A is a photograph confirming antibacterial activities of the compositions of Inventive Examples 5 to 7 against *Staphylococcus aureus*.
Figure 12B:
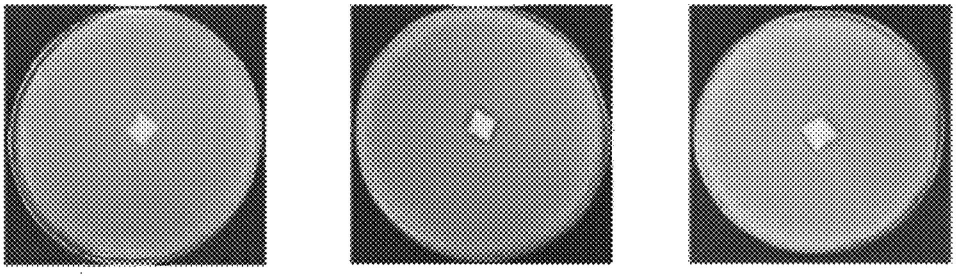
FIG. 12B is a photograph of the result of confirming the antibacterial activities of the compositions of Inventive Examples 5 to 7 against *E. coli*.

In addition, as can be seen in FIG. 12A, in *Staphylococcus aureus*, excellent antibacterial activity of clear area 18 mm was exhibited in the case of the compositions of Inventive Example 5 (ESi20S2) and Inventive Example 6 (T0.5), and antibacterial activity of clear area 20 mm was exhibited even in the case of the composition of Inventive Example 7 (W0.5). As can be seen in FIG. 12B, in *E. coli*, clear area 9 mm of Inventive Example 5 (ESi20S2), clear area 11 mm of Inventive Example 6 (T0.5), and clear area 13 mm of Inventive Example 7 (W0.5) exhibited antibacterial activity.

(2) Antifungal Test

Using ATCC 6275 (*Aspergilus niger*, black mold) as a test strain, a mold spore solution was prepared at a concentration of $0.8\text{-}1.2\times10^{6}$. The prepared spore solution was sprayed on potato dextrose agar (PDA) on which a film having a size of 20×20 mm was placed. After mold was cultivated at 25° C. for 2 weeks, growth of the mold was measured according to ASTM G21 standard. For the comparison of the antifungal effect, the spore solution was sprayed in the same manner on qualitative filter paper (Whatman, Grade 1, Φ55 mm) as a control group.

The determination criteria are as follows:

0=No bacteria

1=Sign of growth of bacteria (less than 10%)

2=Slight growth of bacteria (10 to 30%)

3=Growth of bacteria (30 to 60%)

4=A large growth of bacteria (60 to 100%)

Figure 12C:
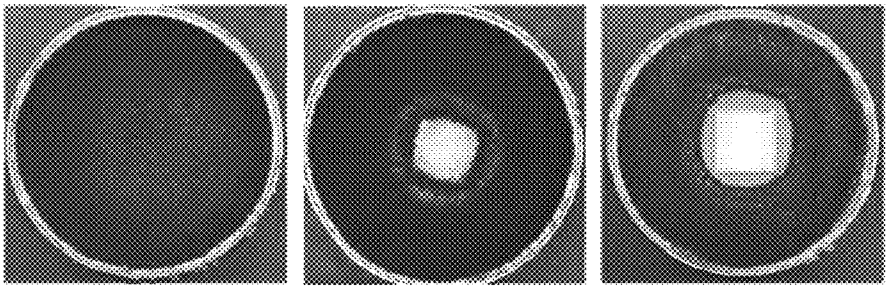
FIG. 12C is a photograph of the result of confirming the antibacterial activities of the compositions of Inventive Examples 5 and 7 against black mold.

As a result, it could be confirmed in FIG. 12C that, in the case of the control group, the determination result is 4 (growth rate of fungus: 60 to 100%), which shows that black mold fungus has grown a lot, and in the case of using the composition of Example 5 (E78Si20S2), the determination result 3 (growth rate of fungus: 30 to 60%) and in the case of using the composition of Example 7 (W0.5), the determination result is 2 (growth rate of fungus: 10 to 30%), which shows excellent antifungal activity.

3. Measurement of Viscosity of Composition for Blocking Radon

1) The compositions of each Comparative Example and Inventive Examples prepared in the above 1 were irradiated with an electron beam. In this case, the electron beam irradiation device used a 10 MeV electron beam accelerator (output: 30 kW, maximum current: 3 mA), and the irradiation dose was set to 0, 1, 3, 5 and 10 kGy, respectively.

Figure 2:
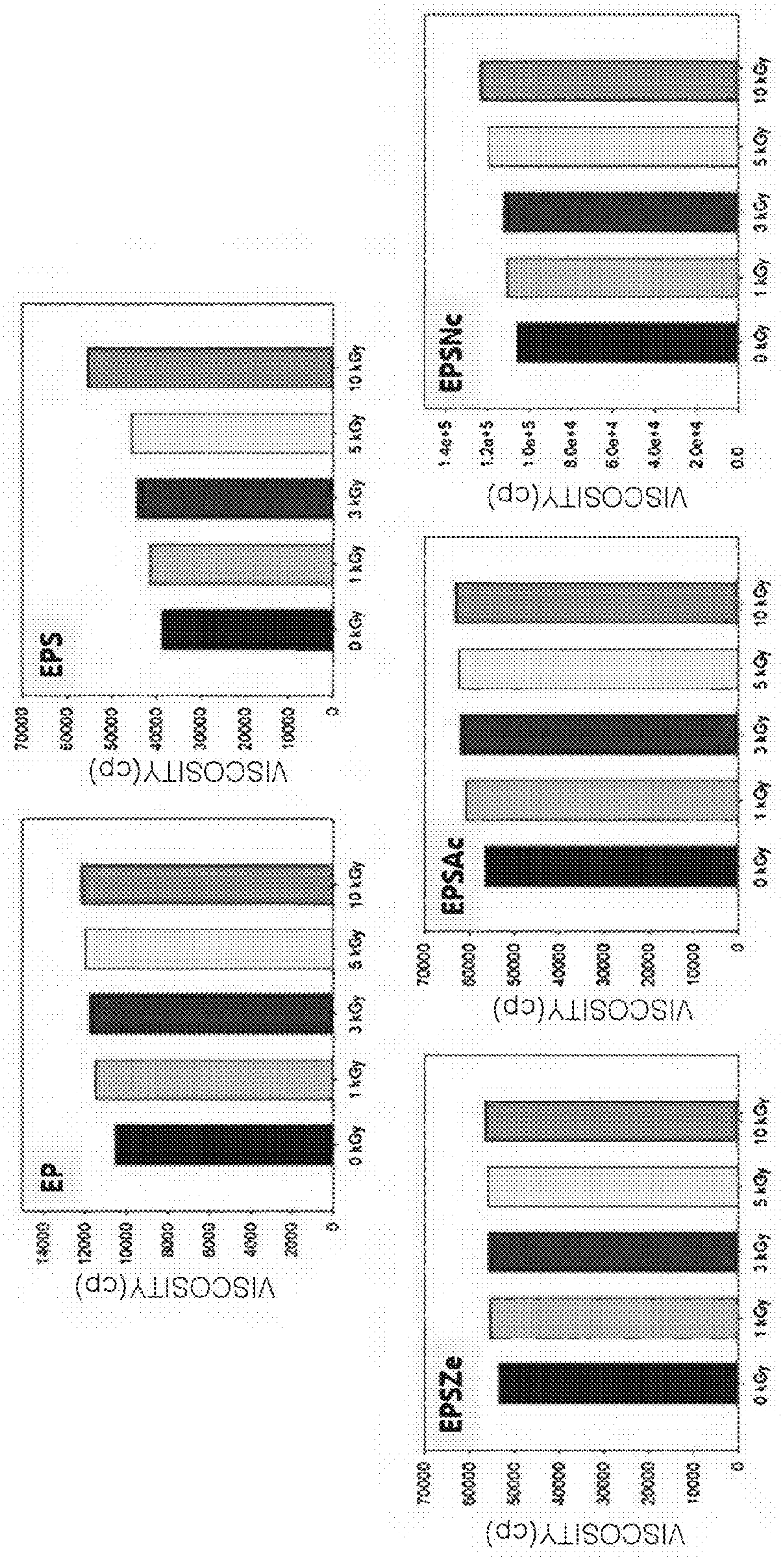
FIG. 2 is a graph showing a change in viscosity according to an electron beam irradiation dose in the compositions of Comparative Examples and Inventive Examples.

As a result, the obtained compositions were each divided into 50 g to measure the viscosity. In this case, to measure the viscosity, the test was performed using the LVDV-IT+ Digital viscometer equipment of Brookfield Company. All the compositions were tested using spindle No. 7, and the viscosity was measured while controlling the rpm, and the results were shown in Table 2, FIGS. 2 and 6 below.

TABLE 2

| Unit: cp | EP | EPS | EPSZe | EPSAc | EPSNc |
|---|---|---|---|---|---|
| 0 kGy | 10,520 | 38,720 | 53,230 | 56,360 | 105,330 |
| 1 kGy | 11,500 | 41,380 | 55,370 | 60,850 | 110,800 |
| 3 kGy | 11,780 | 44,270 | 55,600 | 61,870 | 111,600 |
| 5 kGy | 11,980 | 45,580 | 55,940 | 62,320 | 119,300 |
| 10 kGy | 12,180 | 55,370 | 56,510 | 63,080 | 123,100 |

It was confirmed that, as a result of measuring the viscosity, the composition of Example 1 (EPS) exhibited increased viscosity than the composition of Comparative Example 1 (EP) due to the addition of SDS as the anionic surfactant, and as a result of comparing the viscosity according to the inorganic filler, a sample to which nanoclay was added exhibited a slightly high viscosity.

Meanwhile, it was confirmed that the magnitude of the viscosity increases as the electron beam irradiation dose increases. It can be seen that the viscosity of the EVA and PU increased due to cross-link formation through radical formation by high energy of radiation.

Figure 6:
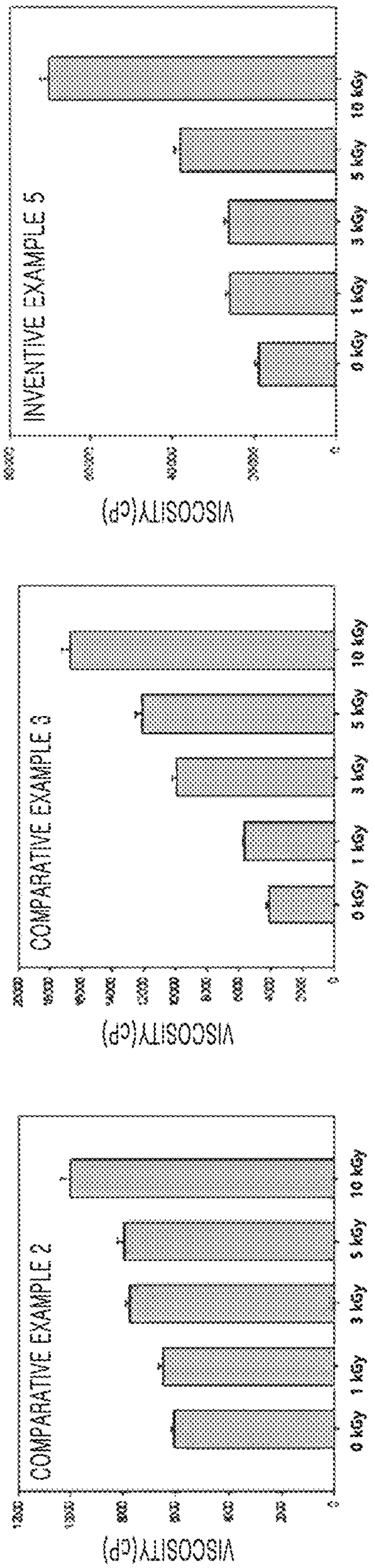
FIG. 6 is a graph illustrating the change in viscosity according to the electron beam irradiation dose in the compositions of Comparative Examples 2 and 3, and Inventive Example 5.

In addition, as can be seen in FIG. 6, as a result of measuring the viscosity, it was confirmed that the composition of Inventive Example 6 (ESi20S2) exhibited increased viscosity than the compositions of Comparative Examples 2 and 3 due to the addition of the SDS as the anionic surfactant.

Meanwhile, it could be seen that the magnitude of the viscosity increases as the electron beam irradiation dose increases. It could be seen that the viscosity of the EVA and silicone resin increases due to the cross-link formation through the radical formation by the high energy of radiation. Meanwhile, when no radiation is irradiated, the composition of Comparative Example 2 (ESi30) had a higher viscosity than the composition of Comparative Example 3 (ESi20), but since the EVA is more affected by radiation than the silicone resin, the viscosity of Comparative Example 3 (ESi20) significantly increased as the dose increases.

4. Evaluation of Physical Properties of Film Using Composition for Blocking Radon (1) Manufacture of Film Using Composition for Blocking Radon.

Using each of the compositions of each Comparative Example and Inventive Example that are irradiated with an electron beam of 3 kGy, a film shape was formed through casting using a glass frame having a size of 2.5 cm in width, 7.5 cm in length, and 0.1 cm in thickness, and a film was dried at room temperature, so a final film was manufactured.

(2) Evaluation of Thermal Stability of Film

Each film prepared in the above (1) was placed in an oven at 40° C., and the shrinkage state was checked for each time.

Figure 3:
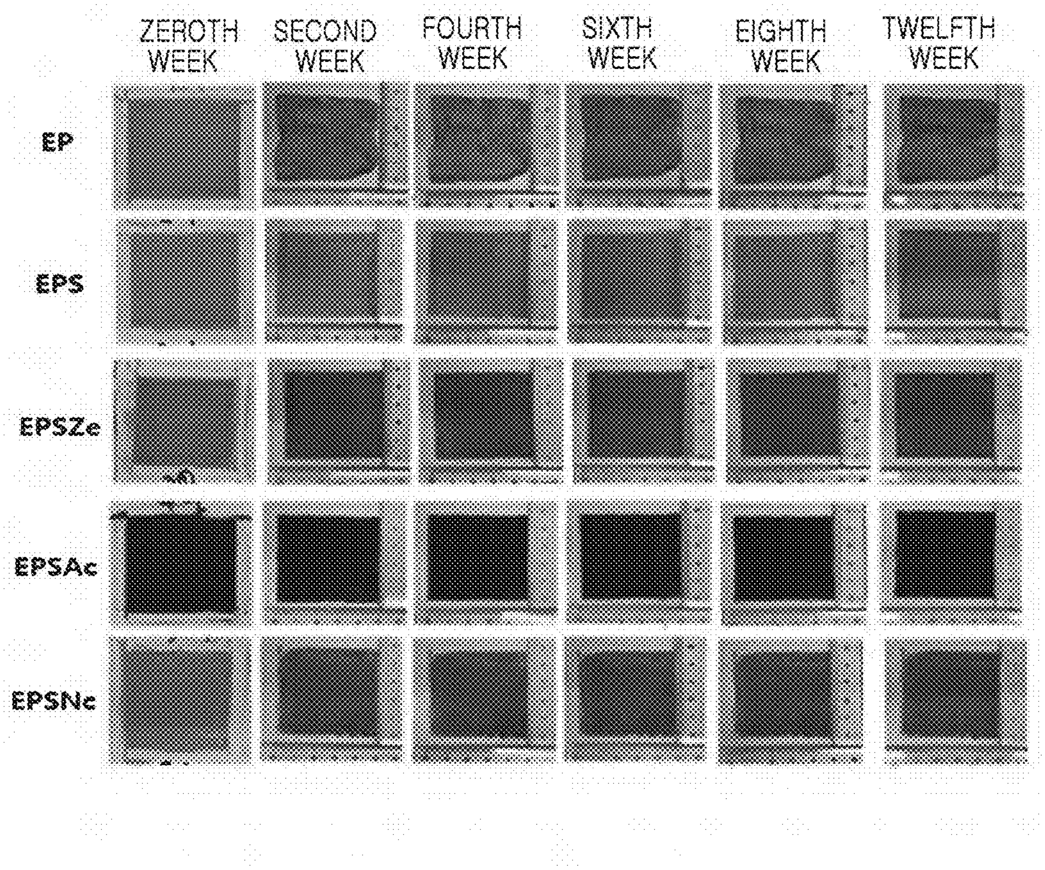
FIG. 3 is the results of confirming a shrinkage rate at 40° C. of films prepared using the compositions of Comparative Examples and Inventive Examples.

As a result, as can be seen in FIG. 3, in the case of the film using the composition of Comparative Example 1 (EP), the film was deformed over time, but the film deformation using the composition of the present disclosure to which SDS was added did not occur.

(3) Thermal Gravimetric Analysis (TGA) Measurement of Film

The TGA was measured to confirm the thermal properties of each film prepared in the above (1). During the measurement, the temperature of each completely dried film was increased from 30° C. to 700° C. at a rate of 10° C./min.

Figure 4:
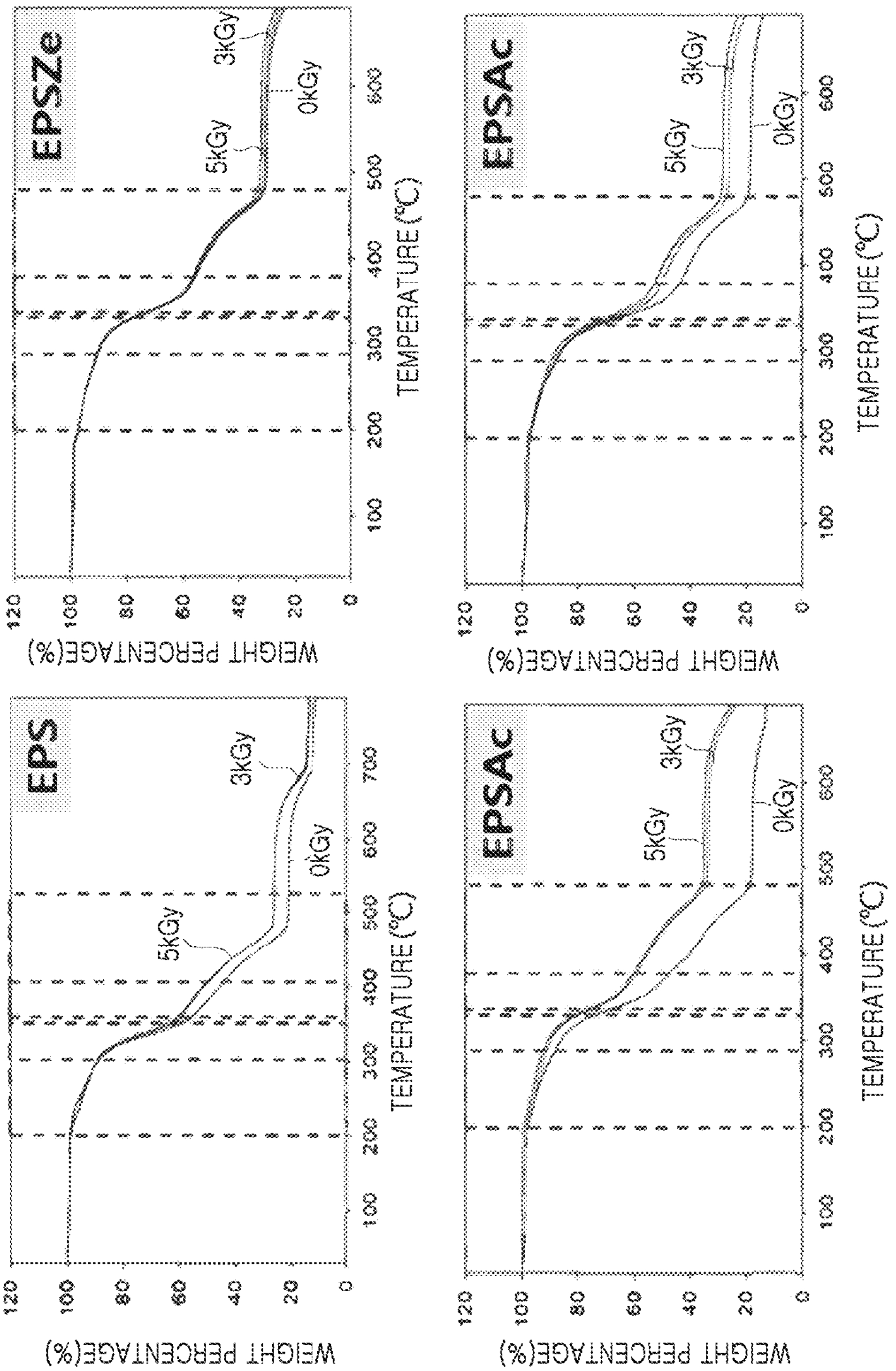
FIG. 4 is a diagram illustrating thermal gravimetric analysis (TGA) measurement results of the films prepared using the compositions of Comparative Examples and Inventive Examples.

As a result, as can be seen in FIG. 4, it could be confirmed that the thermoelectric stability of the coating film increased as the radiation dose increased in each film.

(4) SEM-EDS Analysis

The film prepared in the above (1) was cut to a predetermined size, and then, was attached to a mount using a carbon tape. Thereafter, the sample was coated with platinum for 60 seconds using a sputter coater, and the SEM image was measured for the image of the film with a voltage of 15 kV. In addition, the distribution of elements in the sample was confirmed using EDS, and the dispersibility was confirmed through mapping.

Figure 7:
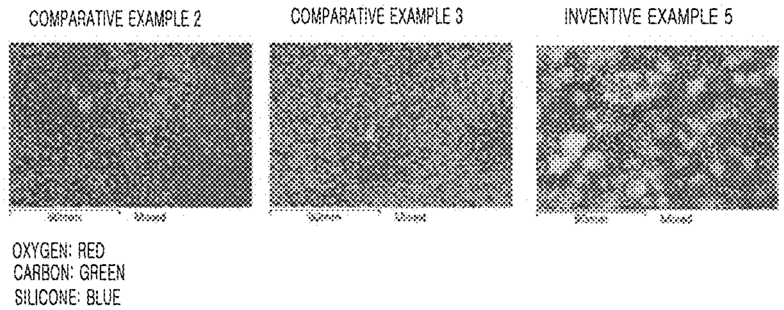
FIG. 7 is a diagram illustrating elemental analysis maps of films prepared using the compositions of Comparative Examples 2 and 3, and Inventive Example 5.

As a result, as can be seen in FIG. 7 through the elemental analysis map, it could be confirmed that the dispersibility of the EVA and silicone decreased in the sample to which the SDS was not added, while the dispersibility of the silicon was improved in the sample to which the SDS was added.

(5) Evaluation of Accelerated Weather Resistance of Film

The accelerated weather resistance test of each film prepared in the above (1) was performed using KS M ISO 16474-2: 2013, cycle No. 4, and was performed by setting the accelerated weather resistance test conditions were as follows.

Light Source: 12000 W Xenon Arc
Amount of light (Irradiance): 0.51 W/m
B.P.T (Temperature at surface of sample): 63° C.±3° C.
Humidity: 50%±5% RH,
Inner/Outer Filter: Borosilicate/Borosilicate
Spray Cycle: 18 min/120 min
Exposure Time: 300 h

TABLE 3

| Method A-Exposure with Solar Filter (Artificial Weathering) | | | | | | |
|---|---|---|---|---|---|---|
| | | Radiant Amount | | | | |
| Cycle No. | Exposure Time | Broadband (300 nm~ 400 nm) $W/m^2$ | Narrowband (340 nm) W/(m · nm) | Black Final Temperature ° C. | Chamber Temperature ° C. | Relative Humidity % |
| 4 | Dry for 102 minutes | 60 ± 2 | 0.51 ± 0.02 | 63 ± 3 | 38 ± 3 | 50 ± 10 |
| | Moisture Spray for 18 minutes | 60 ± 2 | 0.51 ± 0.02 | — | — | — |

Figure 8A:
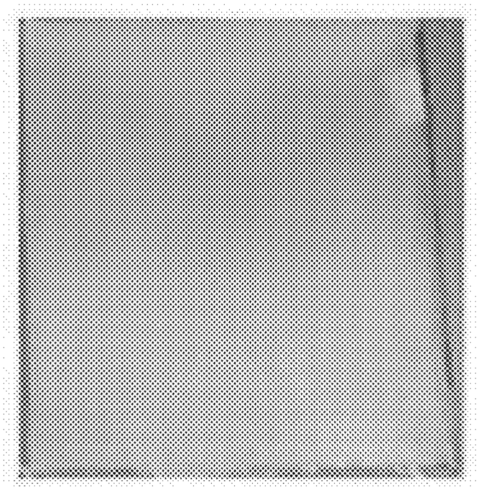
FIGS. 8A and 8B are an accelerated weather resistance test images of a sample irradiated with electron beams of 0 kGy(a) and 3 kGy(b) using the composition of Inventive Example 5.
Figure 8B:
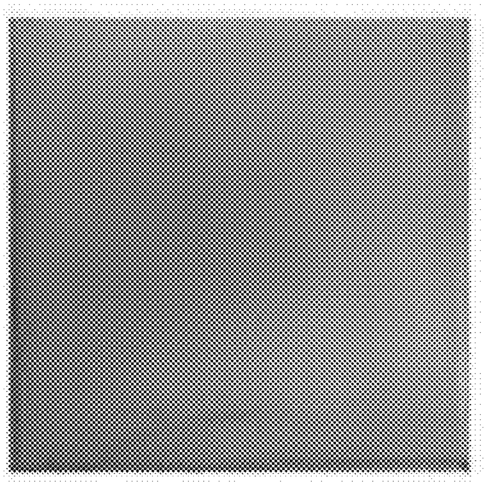

The accelerated weather resistance evaluation was performed for 300 hours, and as a result, as can be seen in FIGS. 8A and 8B, in the case of the sample not irradiated with radiation (FIG. 8A), the phenomenon such as swelling of an appearance was observed, but in the sample irradiated with 3 kGy (FIG. 8B), it was confirmed that the phenomenon such as cleavage and swelling did not occur.

Figure 5A:
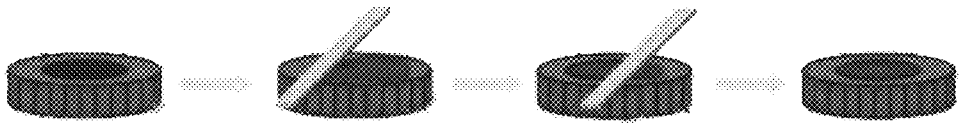
FIG. 5A is a diagram schematically illustrating a process of disposing a radon blocking composition (radon shielding agent) in a hole of a lid of a bottle containing a radon generation source to measure a radon blocking rate.
Figure 5B:
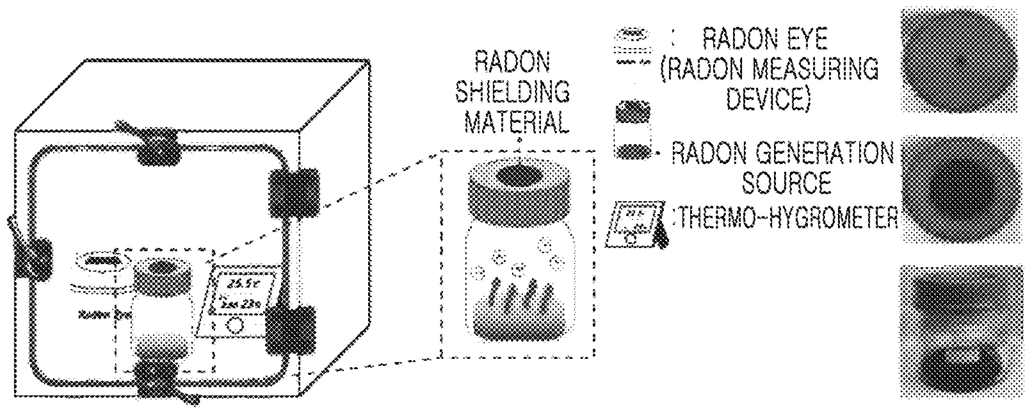
FIG. 5B is a diagram schematically illustrating a radon blocking rate experimental device using the same.

5. Measurement of Radon Blocking Rate of Composition for Blocking Radon 20 g of soil with a high radon emission concentration was put into a white media bottle and used as a radon generation source. The hole was coated in the same manner as in FIG. 5A using each composition of the embodiment of the present disclosure irradiated with an electron beam of 3 kGy as a radon shielding agent for blocking the hole in the lid of the media bottle having a circular hole having a diameter of 5 mm, and then, was dried naturally for 24 hours. As schematically illustrated in FIG. 5B, the radon blocking rate was measured for 7 days by putting each media bottle that has been dried into a small acrylic chamber equipped with a radon measuring device (radon eye plus 2), and then completely sealing the bottle by checking whether gas leaks.

Figure 5C:
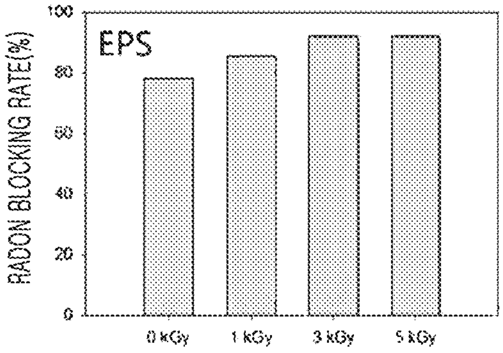
FIG. 5C is a diagram illustrating the radon blocking rate (radiation shield, %) according to an inorganic filler.

As a result, as illustrated in FIG. 5C, when the composition prepared by adding inorganic fillers such as zeolite, activated carbon, and nanoclay was used, an excellent radon blocking rate of about 90% or more was exhibited, and in particular, when the composition to which the zeolite is added was used, an excellent radon blocking rate of 95% or more was exhibited.

Figure 5D:
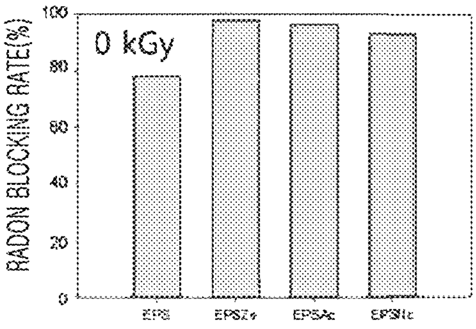
FIG. 5D is a diagram illustrating the result of the radon blocking rate according to a radiation dose.

Meanwhile, in the case of using the composition of Inventive Example 1 (EPS) to change the radiation dose, as illustrated in FIG. 5D, it could be confirmed that, when the composition of Example 1 not irradiated with radiation was used, the radon blocking rate of 80% or less was exhibited, but in the case of using the composition of Inventive Example 1 irradiated with radiation, the morphological stability of the film increased due to the formation of the cross-linked structure by the irradiation with radiation, in the case of irradiating doses of 3 kGy and 5 kGy, the radon blocking rate is 90% or more.

Figure 9A:
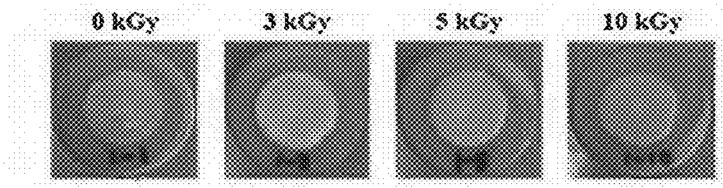
FIGS. 9A-9C are photographs of the experimental process for measuring the radon blocking rate.
Figure 9B:
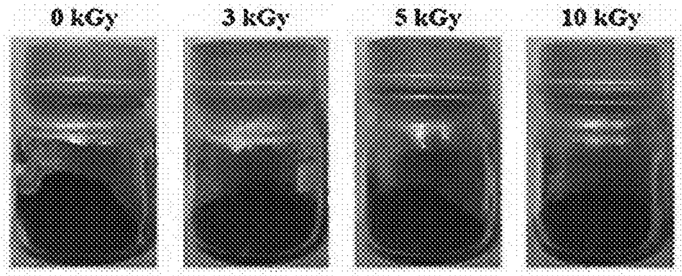
Figure 9C:
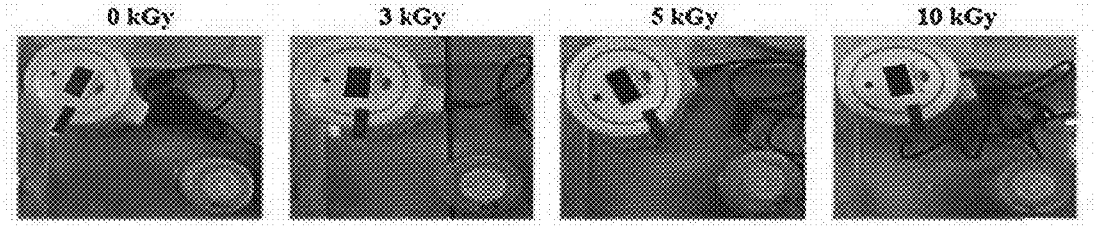
Figure 10:
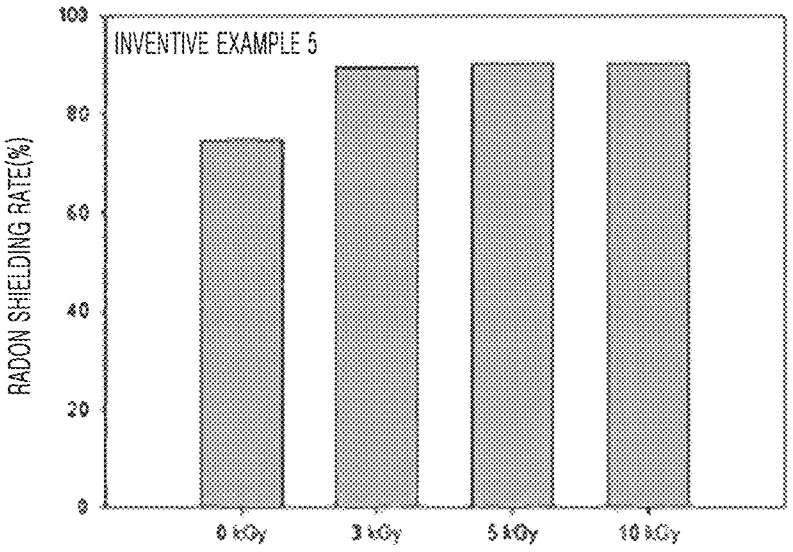
FIG. 10 is a diagram illustrating a change in a radon blocking rate according to the radiation dose for the composition of Inventive Example 5.

In addition, FIG. 10 shows a photograph of the experimental process for the composition of Inventive Example 5, FIG. 9A illustrates a lid coating a hole, FIG. 9B illustrates a side photograph of the media bottle containing the radon generation source, and FIG. 9C is a photograph showing a radon blocking measurement chamber.

As a result, as illustrated in FIG. 10, in the case of the sample of Inventive Example 5, the sample not irradiated with radiation exhibited a radon blocking rate of about 75%, but in the sample irradiated with radiation, the morphological stability of the coating film increased due to the formation of the cross-linked structure by the irradiation with radiation, which exhibited the radon blocking rate of about 90% at doses of 3, 5, and 10 kGy, respectively.

Figure 11:
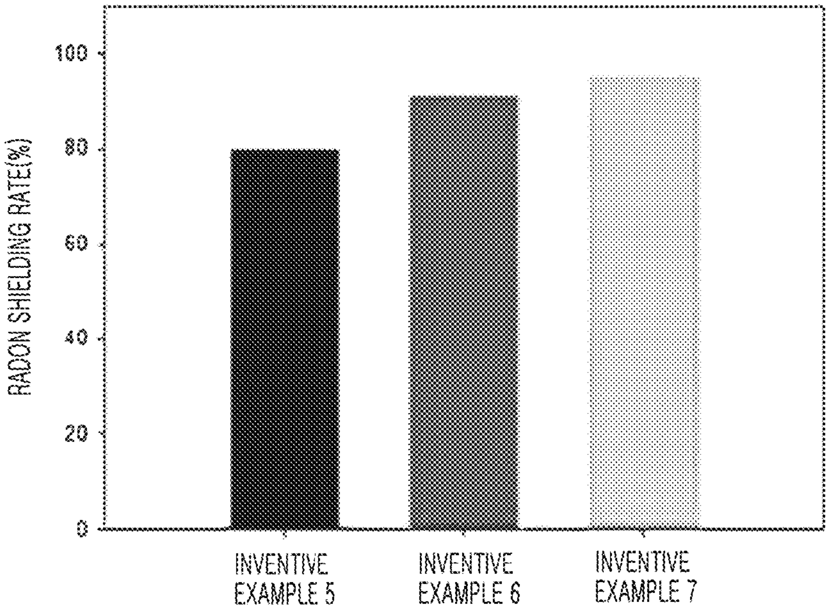
FIG. 11 is a diagram illustrating the changes in the radon blocking rates in the compositions of Inventive Examples 5 to 7.

Meanwhile, FIG. 11 illustrates the radon blocking rate of the compositions of Examples 5 to 7 of the present disclosure. It could be confirmed that, when the composition to which titanium dioxide and illite, respectively, are added is prepared, an excellent radon blocking rate of about 90% or more was exhibited, and in particular, when the composition to which the illite is added is prepared, the excellent radon blocking rate of 95% or more was exhibited.

Since the composition for blocking radon of the present disclosure may express excellent radon shielding performance while being harmless to the human body, and furthermore, express antibacterial activity, it is possible to effectively block radon generation from various objects, such as cracks and crevices in buildings and construction materials, etc. In particular, the composition for blocking radon of the present disclosure has the advantage of being able to minimize damage to the human body by implementing a safe indoor environment by an easy process because construction is simple, and to extend the lifespan of buildings, construction materials, etc.

While exemplary embodiments have been shown and described above, it will be apparent to those skilled in the art that modifications and variations could be made without departing from the scope of the present disclosure as defined by the appended claims.

What is claimed is:

1. A composition for blocking radon, consisting of:

40 to 90 wt % of ethylene vinyl acetate (EVA);

10 to 50 wt % of one or more polymer resins selected from the group consisting of polyurethane (PU) and silicone resin; 1 to 10 wt % of anionic surfactants; and illite nanopowder having an average particle diameter of 200 to 3,000 nm, wherein the illite nanopowder is included in an amount of 0.1 to 20 parts by weight per 100 parts by weight of a mixture including the ethylene vinyl acetate (EVA), the polymer resins, and the anionic surfactants.

2. The composition of claim 1, wherein the composition for blocking radon includes 60 to 80 wt % of ethylene vinyl acetate (EVA), 10 to 35 wt % of polymer resin, and 1 to 10 wt % of anionic surfactants based on a total weight of the composition for blocking radon.

3. The composition of claim 1, wherein the anionic surfactants include one or more anionic surfactants selected from the group consisting of sodium dodecyl sulfate (SDS), sodium bis(2-ethylhexyl) sulfosuccinate (AOT), dodecylbenzenesulfonic acid, sodium dioctylsulfosuccinate, sodium alkylphenol ether sulfonate, and sodium alkyl sulfonate.

4. The composition of claim 1, wherein the composition for blocking radon is a coating composition.

5. A method for preparing a composition for blocking radon, comprising:

preparing the composition for blocking radon of claim 1; and irradiating radiation to the composition for blocking radon for cross-linking, wherein the radiation is irradiated with a dose of 3 to 50 kGy.

6. The method of claim 5, wherein the radiation is selected from the group consisting of gamma rays, electron beams, ultraviolet rays, and X-rays.

* * * * *